Oct. 16, 1951     J. L. RUPP     2,571,988
STORAGE BATTERY
Filed Sept. 16, 1949
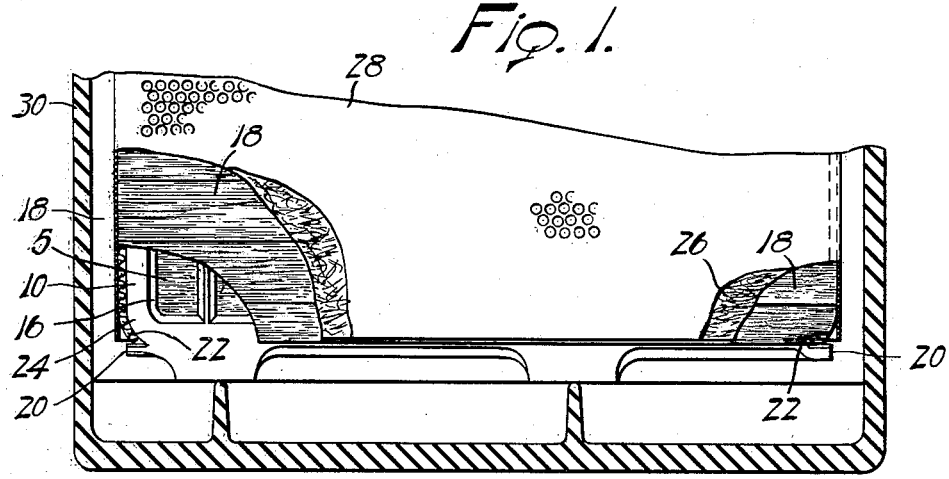
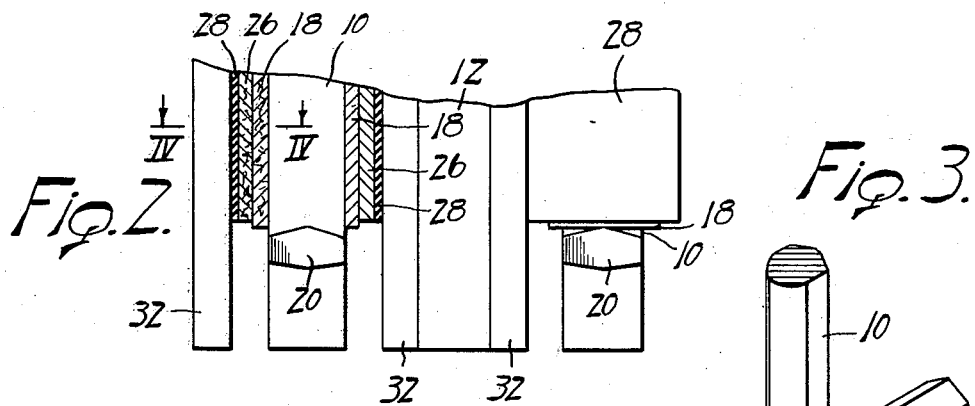
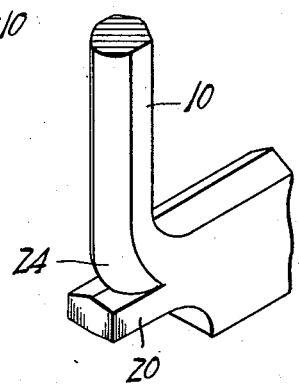
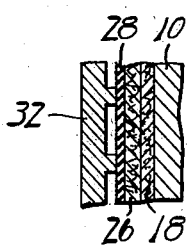
INVENTOR
John L. Rupp
BY Bean, Brooks, Buckley + Bean
ATTORNEYS Patented Oct. 16, 1951

2,571,988

UNITED STATES PATENT OFFICE 2,571,988

STORAGE BATTERY

John L. Rupp, Williamsville, N. Y., assignor to National Battery Company, St. Paul, Minn.

Application September 16, 1949, Serial No. 116,020

6 Claims. (Cl. 136—147)

This invention relates to storage batteries of the lead-acid type employing pasted plates, and more particularly to provision of a novel arrangement for preventing the sloughing out and/or shedding and loss of active paste material from the positive grids.

In storage batteries of the type referred to, it is known that the electrodes suffer gradual loss of active paste material throughout the life of the battery, and that this effect is most serious in the case of the positive plates where the lead peroxide may exist in a somewhat granular and poorly cohesive state. For example, during the charging period bubbles of gas developing in the interior of a positive plate and proceeding to the surface thereof may cause fine particles of the active material to be dislodged and to fall to the bottom of the container where the material accumulates as a sediment or "mud." Similarly, during discharge, the active material may be dislodged as a result of the mechanical action accompanying the formation of lead sulphate which occupies a greater volume than does the lead peroxide which it replaces. Also, physical motion of the battery, due to sudden jars or to other stresses, may tend to dislodge particles of the active material, and in any case the immediate effect of such loss of active material is to seriously reduce the capacity of the battery as well as to substantially shorten its life.

Various methods have been previously employed to check this loss of active material from the positive plates. One such method is to provide a retainer consisting of a thin sheet of slotted or perforated hard rubber on either side of the positive plate and in intimate contact therewith. The slots or perforations in the retainer are sufficiently numerous to permit the electrolyte to gain access to the plate, while on the other hand they are individually small enough to provide some holding effect against the active material of the plates. Glass wool or glass fibre mats have also been employed as separators between the positive and negative plates for the purpose of reducing the loss of active material, and such glass wool sheets or mats are generally employed in combination with wood or rubber separators; but all such arrangements of the prior art are defective because they do not adequately prevent shedding out of the active material.

Still another form of paste retainer comprises a wrapping composed of a ribbon or strands of glass fibre material wound around about the plate in vertical directions in an effort to hold the active paste material in the plate sockets; but prior type arrangements of this kind have been defective because of slippage of active material alongside the ribbon fibres and difficulty in maintaining the wrapper tightly pressed against the faces of the grid, and inability to retain the wrapper strands against sliding off the plate.

In accordance with the present invention, novel means are employed which provide for a highly effective retention of active material such as has not been possible heretofore. The invention provides broadly that each positive plate be more or less completely wound or swathed with a ribbon consisting of strands of spun glass or other suitable fibrous material, while a glass fibre mat is pressed firmly against such winding at the opposite faces of the plate to resiliently bias the fibre winding material against the grid faces in improved manner. Furthermore, the invention contemplates provision of ledge or hook devices at the bottom corners of the plate, upon which the bottom strand of the ribbon winding rests so that the winding is prevented from slipping off the bottom end of the plate and thereby becoming loosened and deficient as a paste retainer means. Thus, the glass fibre winding and mat devices form about the positive plate a positionally locked and virtually impenetratable enclosure as regards the active material, while permitting perfectly free access to the electrolyte.

Accordingly, it is an object of this invention to provide improved means for preventing loss of active material from the plates of lead-acid storage batteries and the like.

Another object of the invention is to provide means for protecting the positive grids of lead-acid storage batteries against premature disintegration.

A further object of the invention is to provide in a battery grid an improved glass fibre ribbon wrapper retaining means which will cause the ribbon wrapping to remain in place and to be held firmly against the active material of the grid by reason of being resiliently biased against the grid.

A still further object of the invention is to provide improved means for protecting the horizontally wound glass fibre ribbon against injury at the edges of the grid and to provide for the secure anchorage thereof against slipping off the grid.

In the drawing:

Fig. 1 is a fragmentary section of a storage battery, showing the positive plate enclosure means of the invention; some of the elements being broken away to show the construction;

Fig. 2 is a fragmentary sectional view thereof;

Fig. 3 is a perspective view of a detail of the grid construction; and

Fig. 4 is a fragmentary section taken on line IV—IV of Fig. 2.

Referring to Figs. 1, 2, 3, there is shown an assembly of storage battery electrodes comprising a set of alternately disposed positive plates 10 and negative plates 12. It will be understood that the illustration is not intended to represent a complete battery assembly but is merely illustrative of a sufficient number of electrodes to disclose the present invention. In accordance with the invention, and in order to prevent or greatly retard the loss of active material 5 from the sockets 16 of the positive plates resulting from chemical activity and/or mechanical movement of the electrodes as hereinbefore described, there is wound or swathed about each positive electrode a ribbon 18 consisting of strands of spun glass or other suitable fibrous material. This spun glass ribbon may be wound diagonally, longitudinally, or transversely upon the positive electrode, or any combination or variation of these windings may be employed, but preferably the spun glass ribbon layer next to the grid is wound thereon so that the strands run substantially horizontally so that the strands present horizontal ledge surfaces to the active material of the grid sockets, whereby the material is most effectively blocked against downward shedding out of the sockets. The invention, however, is not limited to the provision of a plurality of layers of ribbon, since it has been found that a single carefully applied layer of horizontally directed ribbon strands is capable of giving very satisfactory results.

The glass fibres comprising the ribbon are preferably of a small enough diameter to permit the ribbon to be wound closely over the edges of the electrodes without too much breakage of the individual fibres. In general, the precise diameter of the fibres is not a critical consideration. By way of example, however, fibres of approximately 0.0007 inch in diameter have given very satisfactory results. The width of the ribbon may be chosen so as to permit a convenient handling and winding thereof. A ¾ inch ribbon has been found satisfactory, although it will be apparent that this dimension may vary widely. Similarly the thickness of the ribbon may vary considerably. In general, however, it has been found that the objects of the invention may be achieved with relatively thin ribbons. For example, a ribbon thickness of 0.0025 inch has given very satisfactory results.

The glass fibres or strands comprising the ribbon are woven to dispose the fibres in a generally longitudinal manner in the ribbon, and this provides a multitude of horizontal ledges bearing directly against the active material, thereby holding the latter against slippage downwardly when the plate is mounted in upstanding position, as distinguished from arrangements wherein the ribbon fibres are otherwise directed and/or when the ribbons are wrapped in vertical directions against the active material. Preferably also, in order to reduce the thickness of the ribbon and to permit ease of winding, no binder or cement need be employed to hold the individual fibres in place, as has been common in the glass wool mats employed heretofore as separators. As a result of this simplicity of composition, the glass ribbon may be produced at very low cost and is of maximum electrolyte permeability.

In winding the ribbon upon the positive plate, it is preferred to provide for a sufficient overlap of adjoining turns to prevent the appearance of open spaces between the turns. If the edges of the ribbon are thinner than the central portions thereof, this overlapping of adjacent turns need not result in a greatly increased overall winding thickness. While the ribbon should be wound rather tightly upon the plate to be treated, it should be borne in mind that the plate may tend to expand somewhat in use, and therefore care should be exercised to avoid winding the ribbon so tightly that subsequent expansion of the plate may break it.

As explained hereinabove, the strands of glass fibre ribbon 18 are disposed to extend substantially horizontally around the plate so that the fibres thereof are substantially disposed horizontally and in engagement with the active paste material of the plate, thereby providing multitudeness horizontal ledge devices bearing against the active material of a character adapted to efficiently resist any tendencies of the material to shed out of the sockets and move downwardly because of the horizontal attitudes of the ribbon fibres. However, it has been determined that whereas such horizontal type wrappings provide optimum support for the active material as long as the wrappings remain in proper position, it has been observed in practice that the lowermost strands of such wrappings tend to slip downwardly and off the bottom end of the plate in response to jarring of the battery. Thus, the lowermost strands of the wrapping might become dislodged from the plate and loosened; which would in turn permit loosening of the higher up strands of the wrapping, whereby the latter would cease to function effective as active material retainers.

Therefore, the present invention further contemplates a novel wrapper anchorage means in the form of hook or ledge devices as indicated at 20—20 in the drawing; said hook devices 20—20 comprising any suitable form of laterally extending abutments at the bottom corners of the plate grid so that the bottom edge of the lowermost strand of the ribbon wrapping will be lodged against the upper faces of the ledges 20—20 when the wrapping is applied to the plate, as indicated at 22—22 (Fig. 1). More specifically, as shown in the drawing, the abutment devices 20—20 may be integrally cast with the grid 10 so as to extend therefrom just below the bottom corner portions 24 of the grid, whereby to provide at each corner of the plate a recessed formation overlying each ledge 20, into which the bottom edge of the lowermost strand of the wrapping is drawn when the wrapping is applied to the plate.

Also, as explained hereinabove the invention contemplates an improved means for retention of the ribbon wrapping material in uniformly firm bearing relation against the opposite faces of the plate; said means comprising a glass fibre mat such as is indicated at 26 (Figs. 1-2) at opposite sides of the plate. Preferably, the glass wrapping and fibre mat and plate assembly is enclosed within a perforated rubber envelope as indicated at 28 for convenience in handling the plate sub-assembly during the manufacturing operations, and also for the purpose of reinforcing the glass fibre members when the plate sub-assemblies are packed within the battery case 30 with suitable separator plates 32 and negative plate 12 disposed there-between. Thus, the rubber envelope 28 will reinforce the glass fibre elements in the regions where they span the grooved portions of the separator plates 32.

The novel retention effect obtained by reason of the present invention derives from the fact that the glass fibre ribbon strands are composed of fibres extending substantially longitudinally of the strands (to provide maximum active material retention effect) and are therefore necessarily of only limited resiliency; while the glass mats 26 are formed of glass fibres which extend in all direction whereby the mats are inherently of high resiliency characteristics. Thus, the mats 26 function to bias the ribbon strands into optimum retaining position in a manner giving greatly improved active material retention compared to arrangements of the prior art. At the same time, it will be understood that the glass fibre constructions of the wrapper and mat elements permit full electrolyte circulation while blocking dislodgment of the active material from the grid sockets. Thus, a retainer assembly of the present invention comprising in combination a wrapper and bias mat unit as explained hereinabove may be of the same total thickness for example as that of a prior art wrapper assembly having no such bias mat while the assembly of the present invention will give much improved active material retention effects.

I claim:

1. A positive electrode structure for storage batteries, comprising a metallic grid, active material pasted on said grid, and means for retarding dislodgement and sloughing of said material from said grid, said retarding means comprising a layer of spun glass fibre ribbon wound about said grid, a mat of glass fibre material pressed against said ribbon layer at opposite sides thereof, the glass fibres of said mats extending in diverse directions to provide optimum resiliency and porosity characteristics, a perforated rubber sheet retainer enclosing said mats, and porous separator plates disposed at opposite sides of said encased grids to separate said poitive electrode from the negative electrodes of a battery.

2. A positive electrode structure for storage batteries, comprising a metallic grid having sockets therein and active material pasted into said sockets, and means for retarding displacement of said material from said grid sockets, said retarding means comprising a spun glass fibre ribbon wound about said grid, a mat of glass fibre material pressed against said ribbon at opposite sides of said grid, the glass fibres of said mats extending in diverse directions to provide optimum resiliency and porosity characteristics, and a porous sheet retainer device enveloping said mats and said ribbon and said grid.

3. A positive electrode structure for storage batteries comprising a metallic grid, active material pasted on said grid, a spun glass fibre ribbon wound horizontally about said grid in contact with said active material, a mat of glass fibre material pressed against said ribbon at opposite sides of said grid, the glass fibres of said mats extending in diverse directions, and a porous sheet retainer device enveloping said mats and said ribbon and said grid.

4. An electrode structure for storage batteries comprising a metallic grid, active material pasted on said grid, a laterally outstanding protuberance adjacent a bottom corner of said grid, and a layer of spun glass fibre ribbon wound horizontally about said grid with the bottom edge of said ribbon layer resting on and supported by said protuberance.

5. An electrode structure for storage batteries comprising a metallic grid having sockets therein, active material lodgments in said sockets, said grid having side edges and a bottom edge with said side edges being recessed at the juncture thereof with said bottom edge, and a spun glass ribbon wound about said grid in substantially horizontal courses with the bottom course thereof fitting within said recesses.

6. An electrode structure for storage batteries comprising a metallic grid, active material pasted on said grid, said grid having side edges and a bottom edge, said side edges being tapered inwardly adjacent the juncture thereof with said bottom edge, said bottom edge being laterally extended beyond the juncture thereof with said side edges whereby to form ledges, and a layer of spun glass fibre ribbon wound about said grid in substantially horizontal courses with the bottom course of said ribbon fitting around said tapered side edge portions and resting against said ledges.

JOHN L. RUPP.

REFERENCES CITED

The following references are of record in the file of this patent:

UNITED STATES PATENTS

| Number | Name | Date |
|---|---|---|
| 397,557 | Knowles | Feb. 12, 1889 |
| 612,649 | Lloyd | Oct. 18, 1898 |
| 696,209 | Sperry | Mar. 25, 1902 |
| 781,795 | Sperry | Feb. 7, 1905 |
| 1,319,940 | Angell | Oct. 28, 1919 |
| 1,363,729 | Haunz | Dec. 28, 1920 |
| 1,474,313 | Allen | Nov. 13, 1923 |
| 1,579,733 | Owen | Apr. 6, 1926 |
| 1,997,391 | Pautou | Apr. 9, 1935 |
| 2,168,366 | Slayter | Aug. 8, 1939 |
| 2,490,630 | Jardine | Dec. 6, 1949 |

FOREIGN PATENTS

| Number | Country | Date |
|---|---|---|
| 262,528 | Great Britain | Dec. 14, 1926 |
| 287,666 | Great Britain | Mar. 29, 1928 |
| 300,536 | Great Britain | Nov. 13, 1928 |
| 343,048 | Great Britain | Feb. 9, 1931 |

OTHER REFERENCES

Publication, "The New Philco Thirty," October 10, 1944, 4 pages.